(12) United States Patent
Johnston

(10) Patent No.: US 8,068,667 B2
(45) Date of Patent: Nov. 29, 2011

(54) SYSTEMS AND METHODS FOR COLOR DATA COMPRESSION

(75) Inventor: Peter Johnston, San Francisco, CA (US)

(73) Assignee: Konica Minolta Systems Laboratory, Inc., Huntington Beach, CA (US)

( * ) Notice: Subject to any disclaimer, the term of this patent is extended or adjusted under 35 U.S.C. 154(b) by 599 days.

(21) Appl. No.: 12/261,745

(22) Filed: Oct. 30, 2008

(65) Prior Publication Data

US 2009/0245630 A1    Oct. 1, 2009

Related U.S. Application Data

(63) Continuation-in-part of application No. 12/078,415, filed on Mar. 31, 2008, and a continuation-in-part of application No. 12/078,417, filed on Mar. 31, 2008.

(51) Int. Cl.
*G06K 9/00* (2006.01)

(52) U.S. Cl. ........................................................ 382/166

(58) Field of Classification Search ........................ None
See application file for complete search history.

(56) References Cited

U.S. PATENT DOCUMENTS

| | | | |
|---|---|---|---|
| 5,610,646 A | 3/1997 | Isaka et al. | |
| 5,680,488 A | 10/1997 | Shimooku | |
| 5,841,552 A | 11/1998 | Atobe et al. | |
| 6,041,165 A | 3/2000 | Morikawa | |
| 6,106,093 A | 8/2000 | Nagoshi et al. | |
| 6,342,950 B1 | 1/2002 | Tabata et al. | |
| 6,570,672 B1 | 5/2003 | Hattori | |
| 6,614,553 B2 | 9/2003 | Nakami et al. | |
| 6,776,544 B2 | 8/2004 | Jauert | |
| 2001/0041056 A1 | 11/2001 | Tanaka et al. | |
| 2005/0007609 A1 | 1/2005 | Itagaki et al. | |
| 2009/0244601 A1 | 10/2009 | Johnston | |
| 2009/0244633 A1 | 10/2009 | Johnston | |
| 2009/0245629 A1 | 10/2009 | Hayami et al. | |
| 2009/0245665 A1 | 10/2009 | Johnston | |

FOREIGN PATENT DOCUMENTS

| | | |
|---|---|---|
| GB | 2 372 898 | 9/2002 |
| JP | 2003-125202 | 4/2003 |

*Primary Examiner* — Yuzhen Ge
(74) *Attorney, Agent, or Firm* — Finnegan, Henderson, Farabow, Garrett & Dunner, L.L.P.

(57) ABSTRACT

Systems and methods are provided for reducing data size of at least one bitmap image comprising at least one block, wherein the block comprises a plurality of image components, each image component being associated with a distinct color plane. The method may include compressing the plurality of image components of the at least one block. The method may further include ranking the plurality of image components using a dominance rank, wherein the dominance rank for an image component is based on a compression ratio for the image component. The method may also include reducing the resolution of at least one image component associated with the block, based on the dominance rank of the color plane associated with the image component.

17 Claims, 5 Drawing Sheets

SYSTEMS AND METHODS FOR COLOR DATA COMPRESSION

CROSS REFERENCES TO RELATED APPLICATIONS

This application is a continuation-in-part of commonly-assigned, co-pending applications, U.S. patent application Ser. No. 12/078,415 (inventor: Peter Johnston) filed Mar. 31, 2008, entitled "Systems and Methods for Resolution Switching"; and U.S. patent application Ser. No. 12/078,417 (inventors: Isao Hayami and Peter Johnston) filed Mar. 31, 2008, entitled "Systems and Methods for Color Data Compression". The above-mentioned applications are hereby incorporated by reference into this application in their entirety for all purposes.

TECHNICAL FIELD

This disclosure relates to data compression for printing systems and in particular, to systems and methods for color data compression on laser printers.

DESCRIPTION OF RELATED ART

A typical printing system may include a print engine that controls various mechanical and electrical parts configured to print data on a page at a predetermined print speed. The print engine is usually controlled by a print controller, which communicates with a print data input device (e.g., a personal computer) and the print engine, to coordinate timing and other parameters related to the printing process. The print controller may receive image data for printing from the input device at an appropriate rate via a data transferring interface, can generate rasterized images, and send them to the print engine for printing.

Some printing systems, such as laser printing systems, may have hard real time requirements so that once a print job has been initiated, data transfers to the print engine occur at a set speed without interruption. However, the bandwidth of the data transferring interface sometimes may not be sufficient to sustain the print speed. For instance, a page containing high resolution images may have a large data size even after image compression. When such a page is being transferred to the print controller from a print data input device at the print speed, the image data may exceed the bandwidth for some time period. As a result, the page for printing may not be completely transmitted to the print controller and print engine before the physical printing starts resulting in a data under-run. Consequently, the page may not be printed properly. The performance of the printing system may therefore be significantly compromised.

Conventionally, the printer controller may include a page buffer capable of buffering an entire page before printing commences. This may allow for some flexibility in how the print data is transferred to the print controller from the print data input device. For example, in order to store a full page of print data including high resolution images, the print controller may use a large amount of additional memory for both code and data storage. This may add substantial cost to the printing system. In addition, memory cannot typically be added by users to many existing printers, so an approach using additional memory will not help printers already on the market. Therefore, there is a need for systems and methods that provide a reliable printing solution that can be implemented for existing printers and that obviates the need for additional memory in the print engine.

SUMMARY

In accordance with the present invention, systems and methods are provided for reducing data size of at least one bitmap image comprising at least one block, wherein the block comprises a plurality of image components, each image component being associated with a distinct color plane. The method may include compressing the plurality of image components of the at least one block. The method may further include ranking the plurality of image components using a dominance rank, wherein the dominance rank for an image component is based on a compression ratio for the image component. The method may also include reducing the resolution of at least one image component associated with the block, based on the dominance rank of the color plane associated with the image component.

Embodiments of the present invention also relate to software, firmware, and program instructions created, stored, accessed, or modified by processors using computer-readable media or computer-readable memory. The methods described may be performed on a computer and/or a printing device.

Additional objects and advantages will be set forth in part in the description, which follows, and in part will be obvious from the description, or may be learned by practice. The objects and advantages will be realized and attained by means of the elements and combinations particularly pointed out in the appended claims. It is to be understood that both the foregoing general description and the following detailed description are exemplary and explanatory only and are not restrictive of the invention, as claimed. These and other embodiments are further explained below with respect to the following figures.

DETAILED DESCRIPTION

Reference will now be made in detail to various embodiments, which are illustrated in the accompanying drawings. Wherever possible, the same reference numbers will be used throughout the drawings to refer to the same or like parts.

Figure 1:
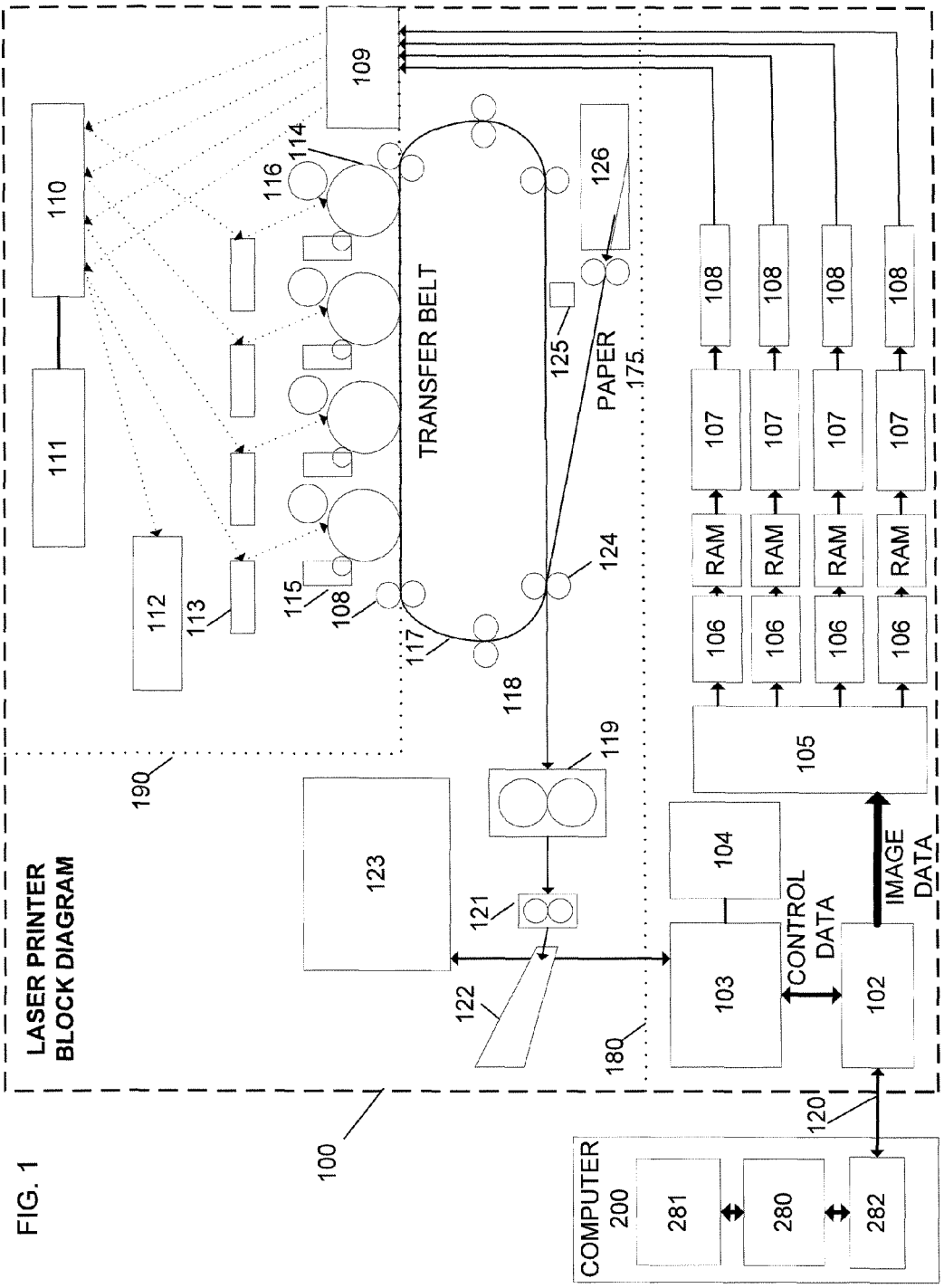
FIG. 1 shows a block diagram of an exemplary printer.

FIG. 1 is a block diagram of exemplary printer 100, which is coupled to exemplary computer 200. In some embodiments, printer 100 may be a laser printer, an LED printer, or any other printer consistent with principles of the present invention. Connection 120 couples computer 200 and printer 100 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as USB, FIREWIRE and/or serial or parallel ports for transmission of data through appropriate connection 120. The communication links could be wireless links or wired links or any combination consistent with embodiments of the present invention that allows communication between computing device 200 and printer 100.

In some embodiments, connection 120 may operate at a predetermined data transferring frequency, or may otherwise have limited bandwidth. For example, connection 120 may operate at a determined frequency of 480 MHz and the corresponding maximum raw bandwidth may be 60 M bytes per second. In some embodiments, the maximum transfer rate of raw data may be lower than the maximum raw bandwidth due to encoding and protocol overhead. Under some exemplary protocols, an isochronous mode of transfer may be supported so that a certain amount of bandwidth may be reserved and data delivery at a corresponding transfer rate may be guaranteed. When the guaranteed transfer rate is lower than the rate at which the print engine consumes image data (i.e., print speed), data under-runs may occur on printer 100.

In some embodiments, the bandwidth of connection 120 may be divided into a plurality of sub-channels, and certain amounts of bandwidth may be reserved for each channel and data delivery at a corresponding transfer rate may be guaranteed for each channel. Data may be transferred via the plurality of sub-channels in a parallel manner. For example, for CMYK color printers, which use cyan ("C"), magenta ("M"), yellow ("Y"), and black ("K"), the print color data may have four planes, and data for each color plane may be transferred via a separate sub-channel of connection 12. In some embodiments, a same bandwidth may be reserved for each sub-channel. In some embodiments, various bandwidths may be reserved for different sub-channels.

In one exemplary embodiment, a USB interface 102 may be used as an interface to receive data via a serial pipe. It is contemplated that other interfaces may be used to receive data via other types of connection 120, such as, for example, FIREWIRE or wireless. Data received by USB interface 102 may be routed internally along internal data paths or data and control signal paths, such as a data bus, to various internal functional modules of printer 100 as determined by control logic in printer 100. In some embodiments, data transmitted to printer 100 by computer 200 may also include destination addresses and/or commands to facilitate routing.

In some embodiments, CPU 103, memory 104, control block 105, decompressor module 106 with attached RAM, PWM logic module 107, and driver circuit 108 may be coupled using the data bus. Data received by USB interface 102 may be placed in memory 104 under the control of the CPU 103 according to some embodiments of the present invention. Decompressor 106 and attached RAM may also be coupled to PWM logic module 107. In some embodiments, decompressor module 106 may receive compressed image data, decompress the received image data, store the decompressed data in RAM, and send the data to PWM logic module 107.

Various data and control signal paths may couple PWM logic module 107, driver circuit 108, printhead 109, mechanical controller 123, beam detect sensor 112 and transfer belt position sensor 125. In some embodiments, printhead 109 may be a laser printhead. In some embodiments, beam detect sensor 112 may generate a start of scan (SOS) or "hsync" signal for each scan line in an image, or for a set of scan lines in an image, and send the generated signal to mechanical controller 123, which then sends a signal to PWM logic module 107.

Driver circuit 108 may be communicatively coupled to PWM logic module 107 and printhead 109. In some embodiments, scanning mirror 110 may be mechanically or electromagnetically coupled to scanning motor 111, which may be used to rotate scanning mirror 110. Each laser beam from printhead 109 may be transmitted to scanning mirror 110 and scanning mirror 110 may reflect that beam, at different times, to beam detect sensor 112 and optical system 113, which may include a cylindrical lens, an f-theta lens, a guide lens, and so on. Optical system 113 may guide laser beams from scanning mirror 110 to photosensitive drum 114. Drum charger 116 may be used to charge photosensitive drum 114. Although only one set of scanning mirror 110, scanning motor 111, and beam detect sensor 112 is illustrated in this figure, four sets of the scanning mirror 110, scanning motor 111, and beam detect sensor 112 may respectively be provided for the laser beams. In this case, each beam detect sensor 112 generates an SOS signal.

In some embodiments, latent images from photosensitive drum 114 may be developed with a toner at developing station 115 before transferring to paper 175. Paper 175 may be passed from paper input tray 126 through transfer rollers 124 to transfer belt 117 where toner images developed at developing station 115 and accumulated on transfer belt 117, may be transferred to paper 175. After the image has been transferred, paper 175 may be moved over paper path 118 using transfer rollers 124 and past fuser 119, guide rollers 121, and to paper output tray 122. In some embodiments, fuser 119 may facilitate the fixing of the transferred image to paper 175.

In an exemplary embodiment, printer 100 may include a printer controller 180 and a printer engine 190. Printer controller 180 may be configured to process image data received from computer 200 via connection 120, and send the processed data to print engine 190 for printing. Printer controller 180 of printer 100 may include, among other things, a USB interface 102, a CPU 103, a memory 104, a control block 105, at least one decompressor module 106 with attached random access memory ("RAM"), at least one pulse width modulation ("PWM") logic module 107, and at least one driver circuit 108. Exemplary printer engine 190 of printer 100 may include beam detect sensor 112, optical system 113, developing station 115, photosensitive drum 114, drum charger 116, scanning mirror 110, scanning motor 111, and printhead 109. The various modules and subsystems described above may be implemented by hardware, software, or firmware or by various combinations thereof.

In some embodiments, computer 200 may send image data to printer controller 180 over connection 120. The image data sent from the computer 200 may be compressed. In some embodiments, the compressed image data may be in a line-sequential compressed format. After image data is received by USB interface 102, the image data may be placed in memory 104 under the control of CPU 103. In some embodiments, when image data for a complete page has been stored in memory 104, a print sequence may be initiated. In some embodiments, mechanical controller 123 may initiate operations of scanning motor 110, photosensitive drum 114, and transfer belt 117 through appropriate data and/or control signals.

Beam detect sensor 112 can detect a laser beam's position and generate pulses (SOS signals) that are sent to printer controller 180 so that image data can be properly aligned from line to line in a printed image. In some embodiments, at the beginning of a scan of each line of the image, light from the printhead 109 may be reflected by scanning mirror 110 onto beam detect sensor 112. Beam detect sensor 112 may signal mechanical controller 123 which, in turn, may send an SOS signal to PWM logic module 107. In some embodiments, a separate signal typically referred to as top of data (TOD) or "vsync" may also be generated by mechanical controller 123, based on information received from transfer belt position sensor 125. The TOD or vsync signal indicates when image data transfer can begin for paper 175. For example, in some embodiments, a TOD signal may be sent to PWM logic module 107 via mechanical controller 123. Once the TOD signal is received, CPU 103 may initiate a transfer from memory 104 to decompressor module 106. In some embodiments, decompressor module 106 may decompress the image data and pass the resulting raw image data to PWM logic module 107. The resultant PWM pulses from PWM logic module 107 may then be streamed to driver circuit 108, which may then transmit the PWM pulses to printhead 109.

In some embodiments, a laser beam from printhead 109 may be modulated and reflected off scanning mirror 110 and optical system 113, causing a latent image of charged and discharged areas to be built up on photosensitive drum 114. In some embodiments, toner develops this latent image at the developing station 115 and the toner image may be transferred to transfer belt 117. For a multi-component image, such as a color image, the latent image building process may repeat for each of the components. For example, for CMYK color printers, which use cyan ("C"), magenta ("M"), yellow ("Y"), and black ("K"), the latent image building process on photosensitive drum 114 may be repeated for each of the colors C, M, Y, and K. Toner images for all four colors may be accumulated on transfer belt 117 before a complete toner image is transferred to the page at transfer roller 124.

In some embodiments, when all components have been assembled on transfer belt 117, paper 175 may be fed from paper input tray 126 to transfer roller 124 where the image may be further transferred to paper 175. Fuser 119 may then fix the toner to paper 175, which is sent to paper output tray 122 using guide rollers 121. In some embodiments, the rate that the images are transferred to paper 175 (i.e., the print speed) may be determined by the rotational speed of transfer belt 117. For example, once the rotational speed is set for the transfer belt 117, the print speed may become constant and any delay in image data transfer to print engine 190 may cause video under-runs and the page may not be printed properly.

A pixel clock generation module (not shown) may be a crystal oscillator or a programmable clock oscillator, or any other appropriate clock generating device. In some embodiments, such as in a "multi-pass" printer 100, which sends the video data for each color serially in sequence, the frequency of the clock generated by the pixel clock generation module may be fixed among each pass of the printer. In an example, multi-pass printer 100, the pixel clock generation module may be a crystal oscillator. In another embodiment, such as a printer 100 that uses multiple sets of printer engine 190, sometimes collectively referred to as a "tandem engine," the frequency of each channel may be calibrated if the frequencies differ among the pixel clocks corresponding to each of the color components. In such embodiments, one or more programmable clock oscillators may be used to allow calibration.

Exemplary embodiments of printer 100 may include driver circuit 108 driving a printer engine 190, and the driver circuit 108 may be connected to multiple printheads 109. In some embodiments, printheads 109 could all be laser printheads. There may also be a plurality of individual modules of printer controller 180. For example, a single decompressor module 106 may be connected to multiple PWM logic modules 107 with each PWM module 107 being connected to one or more pixel clock generation modules and one or more driver circuits 108. Decompressor module 106 and attached RAM could provide each PWM logic module 107 with one or more color components of an image, which would then be sent to the multiple driver circuits 108 for onward transmission to printer engine 190.

In other embodiments, multiple decompressor modules 106 may be coupled to multiple PWM logic modules 107. Each decompressor module 106 may provide a PWM logic module 107 with a decompressed component of the image. For example, for a multi-component image in CMYK color space, which contains cyan ("C"), magenta ("M"), yellow ("Y"), and black ("K") image components, each individual image component may be processed by each decompressor module 106 and sent down to each corresponding PWM logic module 107 in a parallel manner.

Various compression algorithms may be used to achieve optimal compression, including, for example, simple algebraic compression, JBIG, and JPEG. For a given compression algorithm, various compression parameters may be used to achieve desired compression ratios. Different compression algorithms, as well as different compression parameters for the same compression algorithm, when applied to a given image, may result in different compression ratios. In general, the compression ratio may be determined by dividing the data size of uncompressed data by the data size of a compressed version of the same data. For images, the compression ratio may be obtained by dividing the data size of the uncompressed image data by the data size of a compressed version of the same image. The compression ratio, which is dependent on the compression algorithm and the nature of the data being compressed, provides an indication of the extent of data compression. A higher ratio implies that the data has been compressed to a greater extent.

In some embodiments, information related to the compression algorithms and parameters used to compress the color data may be transferred to printer 100 via connection 120, along with the compressed color data. Decompressor module 106 may then decompress each image component with the appropriate decompression algorithms.

In some embodiments, printer 100 may have multiple lasers per laser printhead 109. In some embodiments, printhead 109 may receive multiple lines of data from driver circuit 108 and project the multiple lines of data to scanning mirror 110. Scanning mirror 110 may then reflect the multiple lines of data to beam detect sensor 112 and optical system 113, which may reflect the multiple lines to photosensitive drum 114. In some embodiments, the beam detect sensor 112 may detect a signal, such as a laser signal, reflected off of the scanning mirror 110, or may also detect multiple signals reflected off scanning mirror 110.

Each of the logical or functional modules described above for printer 100 may comprise multiple modules. The modules may be implemented individually or their functions may be combined with the functions of other modules. Further, each of the modules may be implemented on individual components, or the modules may be implemented as a combination of components.

Exemplary computer 200 may be a computer workstation, desktop computer, laptop computer, or any other computing device capable of being used with printer 100. In some embodiments, exemplary computer 200 may include, among other things, a processor 280, a memory 281, and a USB interface 282. Processor 280 may be a central processing unit ("CPU"). Depending on the type of computer 200 being used, processor 280 may include one or more printed circuit boards, and/or a microprocessor chip. Processor 280 may execute sequences of computer program instructions to perform various processes. The computer program instructions may be accessed and read from memory 281, or any other suitable memory location, and be executed by processor 240. Memory 281 may be any type of Dynamic Random Access Memory ("DRAM") such as, but not limited to, SDRAM, or RDRAM.

In one exemplary embodiment, a USB interface 282 may be included in computer 200 as an interface to send and receive data via a serial pipe. For example, USB interface 282 may be coupled to processor 280 to receive data to be printed and send the data to printer 100 via connection 120. It is contemplated that other interfaces may also be used to send data via other types of connection 120, such as, for example, parallel port, FIREWIRE or wireless interfaces.

In order to avoid data under-runs on printer 100, a full page of image data can be transferred from computer 200 to printer 100 at a speed higher than or at least equal to the print speed of printer 100. In one embodiment, a color data compression application such as a color data resolution switching application may be included in computer 200. The color data compression application may be used to reduce the size of the color image data so that the image data transfer rate optimally uses available bandwidth of connection 120, while ensuring that the image data transfer rate does not exceed available bandwidth. For example, the color data compression application may include a module that determines if the resolution of one or more image components may be reduced. In some embodiments, the color data compression application may run on computer 200. It is also contemplated that the color data compression application may be stored on a removable computer readable medium, such as a hard drive, computer disk, CD-ROM, DVD ROM, CD±RW or DVD±RW, USB flash drive, memory stick, or any other suitable medium.

Figure 2:
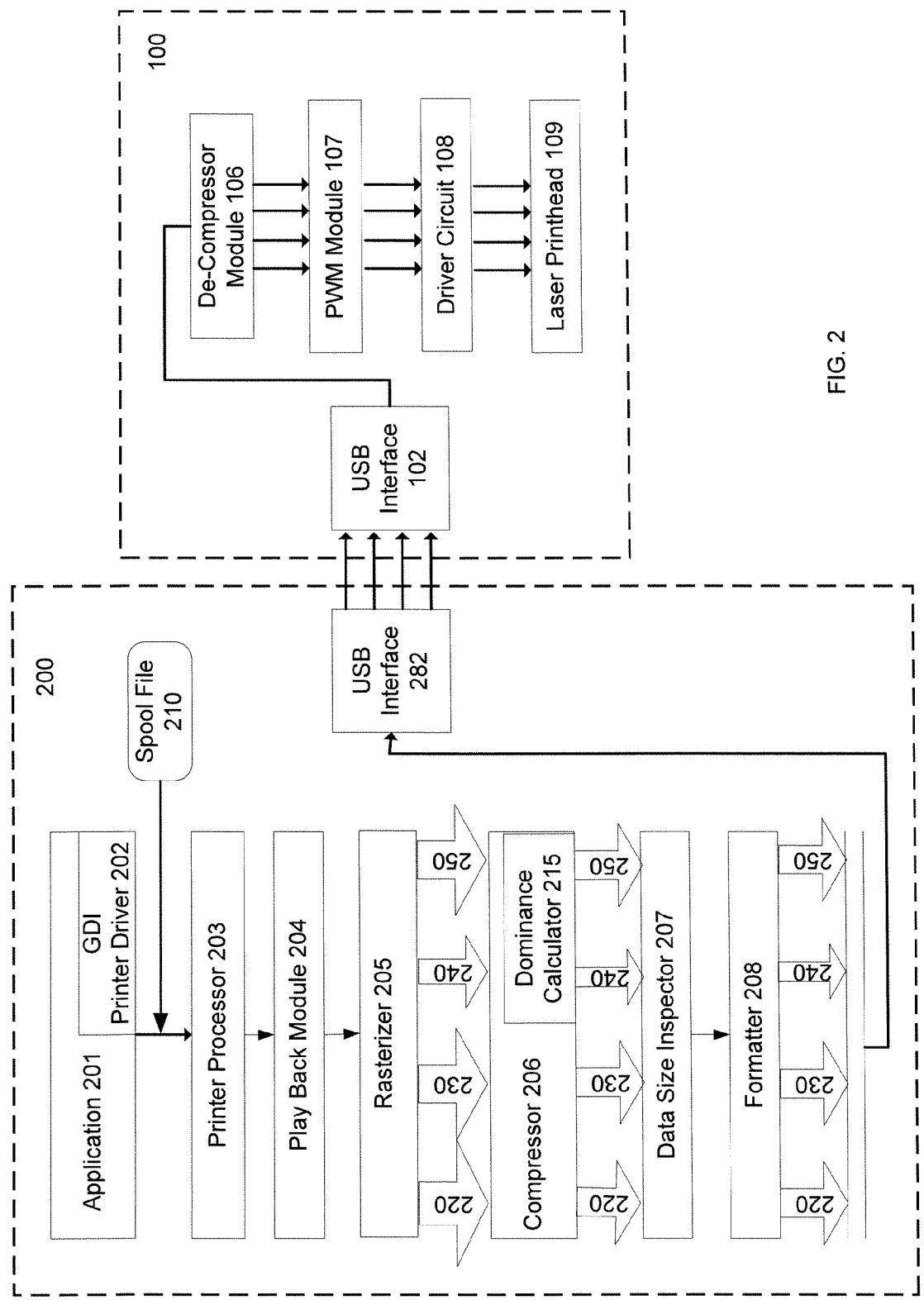
FIG. 2 shows a block diagram indicating an exemplary data flow between an exemplary computer and an exemplary printer for color data compression.

FIG. 2 shows a block diagram indicating an exemplary data flow between an exemplary computer and an exemplary printer for color data compression, according to disclosed embodiments. In an exemplary embodiment, a print job may be initiated by an application 201 running on computer 200. For example, application 201 may use a graphic device interface ("GDI") and printer driver 202 to generate a description of the print job. The description may include the image data to be printed, such as a letter or a picture, and formatting and printing instructions that form the image data into a properly printed page. In some embodiments, application 201 may use GDI and printer driver 202 to format the description in the form of meta-data and generate a print spool file 210.

The size of the image data may vary depending on the number of color planes associated with the data and the resolution of the image. In some embodiments, the image data may include multiple components associated with multiple color planes. For example, the image may be in a CMYK color space and may contain cyan ("C"), magenta ("M"), yellow ("Y"), and black ("K") image components. Each image component may be processed and/or transferred one after another, or in a parallel manner. In some embodiments, the formatting and printing instructions may be created and stored as a header in print spool file 210. In some embodiments, the size of the header file may be relatively constant across print jobs.

In some embodiments, generated print spool file 210 may be sent to a printer processor 203 on computer 200. Printer processor 203 may perform tasks such as collating on print spool file 210 before sending print spool file 210 to a playback module 204 for playback. In some embodiments, playback module 204 may create a list of simple objects that can be rasterized by rasterizer 205, based on the GDI description in print spool file 210.

Print spool file 210 may then be sent to a rasterizer 205. Rasterizer 205 may be configured to transform the image data in print spool file 210 into bitmap data. Rasterizer 205 may further include a frame buffer that can contain information related to how pixels will be printed by printer 100 on a print medium. Rasterized bitmap data may be stored in a frame buffer. In some embodiments, rasterizer 205 may transform the image data block by block, when the size of the image data is relatively large. A color image may include a plurality of image blocks. An image block can include a plurality of image components. Each image component can represent image data for a distinct color plane. For example, the Cyan image component for an image block can include all C-plane data for that image block.

In some embodiments, computer 200 may include a plurality of rasterizers configured to rasterize color data into a plurality of bitmaps. For example, as shown in FIG. 2, rasterizer 205 may be able to rasterize C-plane color data 220, M-plane color data 230, Y-plane color data 240, and K-plane color data 250 in parallel. In some embodiments, rasterizer 205 may include sub-rasterizer modules corresponding to individual color planes, where each sub-rasterizer module may operate on data in its respective color plane.

Consistent with one embodiment of the present disclosure, rasterizer 205 may further compute two components of the image data for these images. In some embodiments, these components could correspond to a lower resolution image component and a delta image component, for the image data of these color planes. For example, the original color data of a particular color plane in print spool file 201 may have a resolution of 600 dpi. Rasterizer 205 may compute a lower resolution image with a resolution of 480 dpi and a delta image that represents the difference information between the original image of that plane and the lower resolution image. In some embodiments, the delta image may include a portion of the original high resolution image data. In some embodiments, the delta image can be used to recover the original higher resolution image when used in conjunction with the lower resolution image of the original image. The computation used to compute the delta image may be mathematically reversed to reconstruct the original image from the lower resolution image and the delta image.

In some embodiments, resolution may be reduced in only one physical dimension. For example, resolution may be reduced only in the main scanning direction (i.e., perpendicular to the direction in which paper is fed to a printer). Reducing resolution in the main scanning direction may permit the image data transfer rate to keep up with print speed. For example, if paper is fed to the printer along its length (i.e. vertically) then resolution may be reduced in the horizontal direction. In some embodiments, resolution may be reduced in both dimensions (horizontal and vertical). Various other algorithms may be used to compute the lower resolution image and the delta image, such as applying low-pass and high-pass filters to the original image.

Rasterized image data (bitmap data) may be compressed by compressor 206. Compression may reduce the size of the image data, and therefore permit transmission of the compressed image data over connection 120 using the available bandwidth. In some embodiments, compressor 206 may use lossless compression methods such as, for example, JBIG and GIF compressions, so that the image may be perfectly reconstructed by decompression at decompressor module 106. When lossless compression is used, the image quality may be preserved through the compression and decompression process. However, a high compression ratio cannot always be guaranteed for lossless compressions. For example, images containing high resolution details may not always compress well, i.e., the size of the compressed image may sometimes be comparable to the size of the original image before compression.

In some other embodiments, compressor 206 may use lossy compression methods such as, for example, JPEG and wavelet compressions. Using lossy compression may yield higher compression ratios on average than lossless compression, but exact reconstruction of the original image from the compressed data may not always be achieved. In some embodiments, compressor 206 may also be configured to use a combination of various compression algorithms. For example, compressor 206 may also be configured to use a combination of lossless compression and lossy compression to achieve a balance between image quality and compression ratio.

In some embodiments, computer 200 may include a plurality of compressors configured to compress color data in the color planes. For example, as shown in FIG. 2, compressor 206 may include four sub-compressors for compressing C-plane color data 220, M-plane color data 230, Y-plane color data 240, and K-plane color data 250 in parallel. In some embodiments, the same compression algorithm and parameters may be applied to image components in all the color planes. The compressibility of each image component may be measured by a compression ratio. Compression ratio may be determined as the data size of uncompressed data divided by the data size of the compressed form of the same data. A higher compression ratio may reduce an image size more aggressively than a lower compression ratio. For example, an image component having highly varying data with detailed information (e.g., pictures) may not compress well and therefore, may have a lower compression ratio. On the other hand, an image component having only slightly varying data may compress well and have a high compression ratio. Therefore, the compression ratio achieved for each image component at compressor 206 may provide an indication of whether the image component includes high resolution information.

In some embodiments, compression ratio may further vary with the choice of compression algorithms and compression parameters. For example, different compression algorithms may be used with different image components to achieve optimal compression. For example, simple algebraic compression may be used to compress color data of higher dominance, and JPEG compression may be used for color data of lower dominance. In some embodiments, the same compression algorithm may be used for different image components, albeit with different compression parameters, to achieve desired compression ratios. For example, the compression ratio can be varied by being more or less aggressive in divisors used for the quantization phase of JPEG compression.

Consistent with one embodiment of the present disclosure, compressor 206 may further include a dominance calculator 215 to determine an order of dominance among a plurality of image components that are associated with distinct color planes. An image component can be considered "dominant" with respect to an image block, if the color data of that color plane contributes to the image block to a greater degree than data of the other image components. In some embodiments, dominance may be determined in accordance with the amount of information contained in the image components. For example, a more dominant color plane may include denser data than a less dominant image component in representing the printed image. As another example, data of a more dominant image component may have a higher resolution than data of a less dominant image component.

Various algorithms may be used by dominance calculator 215 to determine the dominance of one image component relative to other image components, in an image block. In some embodiments, an order of dominance between image components may be determined by compressing the image component associated with each color plane and computing the compression ratio. In some other embodiments, the image components may be ranked in the order of their respective compression ratios. Therefore, the image component associated with the highest compression ratio may be determined as the least dominant image component. For example, the image component associated with the K-plane may be determined as the least dominant image component for a CMYK color image.

Dominance calculator 215 may assign a number to an image component to indicate the dominance rank of the image component. For example, a lower number may be assigned to a less dominant image component. In some embodiments, dominance ranks may be stored in a look-up table that maps the ranks to the various image component blocks.

Compressed color data may be passed from compressor 206 to a data size inspector 207. Data size inspector 207 may be configured to determine if all bitmap images can be sent across connection 120 without exceeding the available bandwidth of connection 120. In some embodiments, data size inspector 207 may make its determination on a block by block basis, or on a line by line basis. In some embodiments, data size inspector 207 may inspect a block of the original image data and determine the total data size of those portions of compressed color data for each color plane that correspond to the block. Data size inspector 207 may then compare the total data size with a data-size threshold. According to one embodiment, the data-size threshold may be determined based on the print speed of printer 100 and the available bandwidth of connection 120. In some embodiment, data size inspector 207 may tag a block if it has a data size that is larger than the data-size threshold.

Compressed color data may be further passed from data size inspector 207 to a formatter 208. Formatter 208 may be configured to accumulate one full image in memory before passing it to USB interface 282 and transferring to printer 100. Consistent with one embodiment of the present disclosure, formatter 208 may be further configured to examine if an image block received from data size inspector 207 is tagged. If an image block is tagged, formatter 208 may remove the portion of the delta image that is associated with the tagged block for one or more image components. In some embodiments, formatter 208 may first remove the delta image associated with less dominant image components, i.e., image components that have orders of dominance lower than a rank threshold.

To avoid unsightly resolution transitions in the middle of highly detailed images, such as photographs, in some embodiments, formatter 208 may grow a non-transition region from a block that is tagged until a "safe-transition" block is reached. The non-transition region may be a region that is less suitable for resolution transitions. For example, the non-transition region may include high resolution details of the image, or may be data intensive portion of the image. In some embodiments, the resolution of each block in the non-transition region can be reduced. A safe-transition block may contain relatively low-resolution image information such that reducing the image resolution may not affect the visual quality of the image and thus, a resolution transition may not be noticeable by human eyes. For example, a region where there is only white space (blank space) or solid colors may be suitable for resolution transition.

The non-transition region may include at least one block. For example, the non-transition region may include a block that is tagged along with a set of contiguous blocks. In some embodiments, formatter 208 may be configured to grow a non-transition region by including additional blocks adjacent to one edge of the region, if there are no safe-transition blocks currently within the non-transition region. In some embodiments, once safe-transition blocks are reached on both ends of the region, formatter 208 may stop growing the non-transition region and remove the portion of the delta image that is associated with the entire non-transition region.

For a block that is neither tagged nor included in a region grown from a tagged block, formatter 208 may reconstruct the block based on the corresponding portions of the compressed lower resolution image and the compressed delta image. Formatter 208 may then buffer one full image in the memory, where the buffered image includes blocks of reduced resolution and blocks of original resolution. Formatter 208 may provide the accumulated full image to USB interface 282.

USB interface 282 of computer 200 may transfer buffered image data in a compressed form to USB interface 102 of printer 100 via connection 120. Note that the use of a USB interface is exemplary only, and that any other interface/connection combination where an estimate of available bandwidth can be obtained may be used. In some embodiments, USB interface 282 may also transfer information related to the compression algorithms and parameters used by compressor 206 to compress the color data to USB interface 102 of printer 100 via connection 120, along with the buffered image. The information may be used later in decompressor unit 106 on printer 100. In some embodiments, an isochronous mode of transfer may be supported so that a certain amount of bandwidth may be reserved for each C/M/Y/K image component, and data delivery at a corresponding transfer rate may be guaranteed. In some embodiments, the same bandwidth may be reserved for each sub-channel. In some other embodiments, various bandwidths may be reserved for different sub-channels.

In some embodiments, the compressed image data may be decompressed by decompressor module 106 using decompression algorithms corresponding to the compression algorithms used by compressor 206. For example, if JBIG compression is used by compressor 206, the JBIG decompression may be used by decompressor module 106. When a lossy compression is used by compressor 206, decompression may not exactly reconstruct the image data as in print spool file 210. In some embodiments, different compression algorithms, or different compression parameters for a single compression algorithm may be used for different image components by compressor 206 to achieve desired compression ratios. Accordingly, decompressor module 106 may decompress each image component based on algorithms and/or parameters used by compressor 206.

In some embodiments, decompressor module 106 may send decompressed image data to PWM logic module 107. The resultant PWM pulses from PWM logic module 107 may then be streamed to driver circuit 108, which may then transmit the PWM pulses to printhead 109. In some embodiments, images may be decompressed block-by-block. In one embodiment, a block of decompressed image data may have a different resolution from another block. For example, a block may have a resolution of 480 dpi, while another block may have a resolution of 600 dpi. In some embodiments, PWM logic module 107, therefore, may be constructed to be able to dynamically switch from a high resolution mode (such as for 600-dpi-driving) or a low resolution mode (such for 480-dpi-driving) on a block-by-block basis. Any appropriate conventional method or mechanism may be deployed for switching of the operation mode of PWM logic module.

Figure 3:
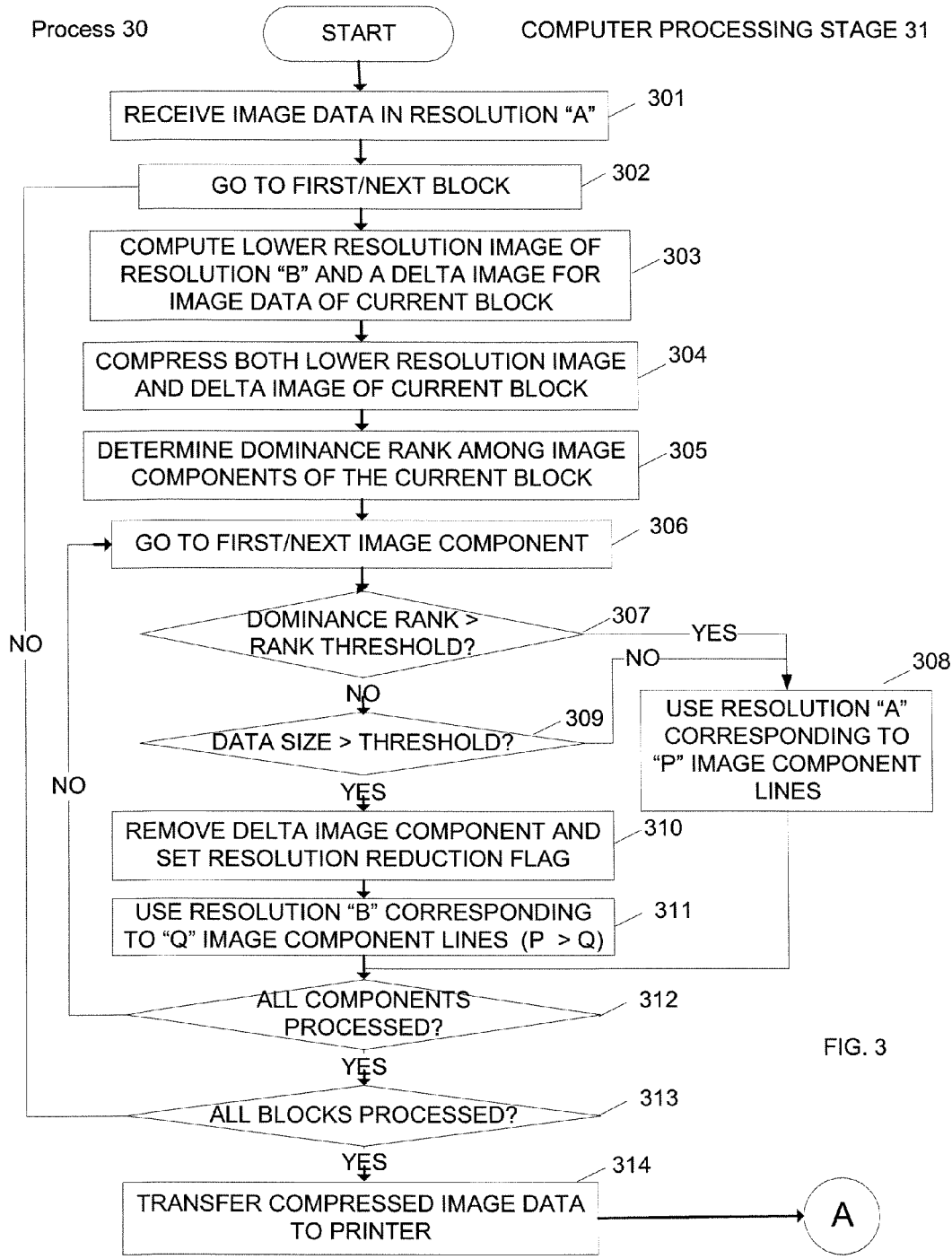
FIG. 3 is a flow chart of an exemplary operation process for color data resolution switching.
Figure 3:
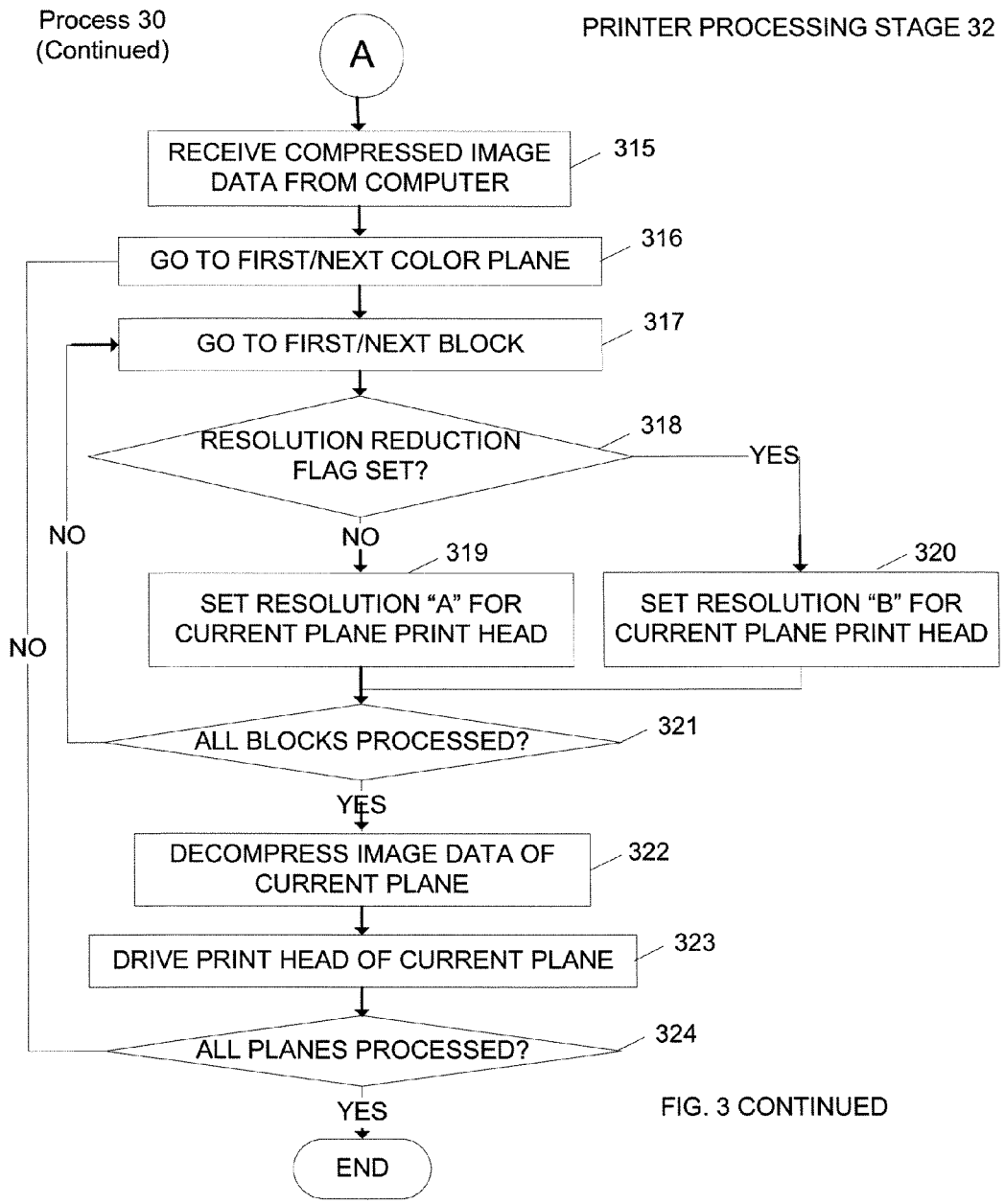

FIG. 3 is a flow chart of an exemplary operation process for color data resolution switching. The algorithm described in FIG. 3 may also be applied to various other types of printing systems such as, for example, copiers and multi-function devices, with appropriate modifications specific to the device and in a manner consistent with embodiments disclosed herein. The algorithm described in FIG. 3 may further be used in conjunction with various software applications to perform resolution switching.

In one embodiment, process 30 may include a computer processing stage 31 and a printer processing stage 32. For example, computer processing stage 31 may include steps 301-314. In step 301, image data of resolution "A" may be received. For example, application 201 may generate a print spool file 210 that contains print image data and printing instructions, and print spool file 210 may be received by printer processor 203 from application 201. The original image data may have original resolution "A", which may be indicated in dots per inch ("dpi") (e.g., A=600 dpi). In some embodiments, the image data may include multiple components associated with multiple color planes. In some embodiments, in step 301, the image data may be separated into blocks. For the smallest granularity, the blocks may be individual lines of the image. Each block may include a plurality of image components, where each image component is associated with a distinct color plane.

In step 302, the first or the next block may be inspected. In some embodiments, a lower resolution image may be computed and a corresponding delta image may be computed for the image data of the current block, in step 303. For example, rasterizer 205 may compute a lower resolution image and a delta image for the image data of the current block. The lower resolution image may be associated with a resolution "B" ("B"<"A"). For example, a lower resolution image with a resolution of 480 dpi may be computed from the original image of the current block with a resolution of 600 dpi. A corresponding delta image may also be computed simultaneously. The delta image represents difference information between the original image and the lower resolution image of the current block. The computation of the delta image may be mathematically reversed to reconstruct the original image of the current block from the lower resolution image and the delta image. The lower resolution image may include a plurality of image components and each image component may be associated with a color plane. Similarly, the delta image may also include a plurality of image components each associated with a color plane.

After the lower resolution image and delta image are computed for the current block, both images may be compressed in step 304. For example, the images may be compressed by compressor 206. Compression may further reduce the size of the images. For example, compressor 206 may use lossless compression methods, so that the image may be reconstructed without degradation when decompressed.

In some embodiments, computer 200 may include a plurality of compressors configured to compress color data of a plurality of color planes. For example, compressor 206 may include four sub-compressors for compressing data in the C, M, Y, and K planes. In some embodiments, the compression ratios for image components associated with an image block may differ from each other. For example, an image component associated with a particular color may contain high resolution details and thus may compress less than one or more of the other image components associated with other colors.

Accordingly, the data size of the high resolution image component may not be significantly reduced after compressions. Consequently, the image component of each color plane may be associated with a different compression ratio. The compression ratio represents the degree to which the data size is reduced by compression. A higher compression ratio indicates that the original data has been compressed more.

In step 305, an order of dominance between image components may be determined for the current block. For example, dominance calculator 215 may be optionally used to rank the image components associated with the color planes by the order of dominance. The compression ratio associated with each image component may be calculated. For example, dominance calculator may calculate a ratio between the data size of an uncompressed image component and the data size of the compressed same image component, associated with each color plane. In some embodiments, the image components may be ranked in the order of the compression ratios. Therefore, an image component associated with the highest compression ratio may be determined as the least dominant image component in the current block. For example, the K-plane image component may be determined as the least dominant image component for a CMYK image block. Exemplary processes to implement step 305 are described in a later part of the disclosure, in connection with FIG. 4.

Various other algorithms may be used to determine the order of dominance. In some embodiments, an order of dominance may be determined by counting the number of bitmap dots for the image components of each color and ranking the image components based on the numbers. In some embodiments, order of dominance among the image components may also be determined by generating gradation histograms for the image components of each color and ranking the colors based on the complexity of the histograms. In yet some embodiments, the order of dominance may be pre-determined and set for printer 100.

In some embodiments, a number indicating dominance rank may be assigned to each image component to indicate its dominance rank among the plurality of image components for the current block. For example, a lower rank may be assigned to a less dominant image component. For example, an image component with dominance rank 1 may be the least dominant in the current block. In some embodiments, the dominance rank can be an integer varying from 1 through N, where N is the number of color planes. For the purpose of this discussion, an image component with a higher dominance rank is assumed to be more dominant than an image component with a lower dominance rank, and the dominance rank is assumed to be an integer from 1 through N, where N is the number of color planes. Therefore, in a four-dimensional color space, an image component with dominance rank 2 is more dominant than an image component with dominance rank 1, and the image component with dominance rank 4 is the most dominant. As may be appreciated by one of ordinary skill in the art, the algorithm can easily be modified if a different scheme is used to determine the dominance rank. For example, in the four color plane system, the image components associated the different color planes may also be separated into two or three dominance classes.

In step 306, the first or next image component may be processed for the current block. In step 307, the algorithm may determine if the dominance rank of the current image component exceeds some specified rank threshold. In some embodiments, the rank threshold may be specified based on the print speed of printer 100 and the available bandwidth of connection 120. For example, the rank threshold may be set lower if the available bandwidth of connection 120 is large compared to the size of the print data. In some embodiments, the rank threshold may be set higher than the dominance rank corresponding to the most dominant image component so that the rank threshold may be higher than the dominance rank of any image components.

If the dominance rank of the current image component exceeds the specified rank threshold then, in step 308, the algorithm may use a resolution "A" corresponding to "P" image component scan lines of the current block. In embodiments where a beam detect sensor 112 can generate a start of scan (SOS) or "hsync" signal for scan lines in the image, the number of SOS signals is proportional to resolution "A". Therefore, printing may take longer, if "A" is high.

If the dominance rank of the current image component does not exceed the rank threshold then, in step 309, the algorithm may determine if both the compressed and delta image components can be sent across connection 120 without exceeding the available bandwidth of connection 120. In some embodiments, the total data size of the compressed lower resolution image component and delta image component that are associated with the current color plane may be determined. For example, data size inspector 207 may use the total pixel count to compute the data size of compressed lower resolution image and the delta image of the current block. The total data size may then be compared with some pre-determined data-size threshold. According to one embodiment, the data-size threshold may be specified based on the print speed of printer 100 and the bandwidth of connection 120.

In step 310, if the total data size (including both the low resolution and delta portions) of the image component exceeds the data-size threshold, then the delta image component associated with the current plane may be removed and the current plane of the current block may be tagged with a resolution reduction flag. Removal of the delta image component of the current block may reduce the resolution of the color data from "A" to "B", for example, from 600 dpi to 480 dpi. Resolution "B" may correspond to "Q" image component scan lines. Removal of the delta image component also reduces the size of the color data associated with the current plane. In some embodiments, a resolution reduction flag may be used to indicate that the delta image component corresponding to the current plane of the current block has been removed.

In some embodiments, the algorithm may grow a non-transition region based on the tagged image component of the current block and remove all corresponding delta image components in the non-transition region that are associated with the color plane of the tagged image component. For example, the non-transition region may include at least one image component including the resolution-reduced image component of the current block, and image components of other blocks that are associated with the same color plane as the tagged image component. In some embodiments, the non-transition region may be grown by including into the non-transition region a block adjacent to a growing edge of the region, if the block is not a safe-transition block.

Once a safe-transition block is reached, further growth of the non-transition region may be stopped and delta image components associated with blocks in the grown non-transition region may be removed. Accordingly, the resolution of the image components associated with the grown non-transition block may be reduced from resolution "A" to resolution "B". In step 311, the algorithm may use resolution "B" corresponding to "Q" scan lines. In some embodiments, Q may be lower than P (from step 308) as resolution "B" is lower than resolution "A".

In step 309, if the total data size of the compressed image component does not exceed the data-size threshold, the color data of the current plane and current block may not exceed the bandwidth. Accordingly, no resolution reduction may be needed and the algorithm may proceed to step 308.

After step 311 or step 308, it may be determined whether all the image components have been processed for the current block, in step 312. If there is still at least one image component associated with the current block left unprocessed, the algorithm may go back to step 306 and process the next image component. The algorithm can iterate through steps 306-312 until all the image components have been processed for the current block.

In step 313, it may be determined whether all the blocks of the image data have been processed by the computer. If there is still at least one block of the image data left unprocessed, the algorithm may go back to step 302 and process the next block. The algorithm can iterate through steps 302-313 until all the blocks have been processed by the computer.

In step 314, color data of all the color planes may be transferred to a printer in a compressed format. For example, color data may be transferred from computer 200 to printer 100 via connection 120. In some embodiments, color data of the multiple color planes may be transferred in a parallel manner. In some embodiments, in step 314, information related to resolution switching, such as resolutions "B" and "A", and data compression algorithms and parameters used to compress the color data in step 304 may be transferred to printer 100 via connection 120, along with the compressed color data. For example, the information may be included as a header of the compressed color data.

In some embodiments, computer processing stage 31 may conclude at this point, and printer processing stage 32 may begin at step 315. In some embodiments, printer processing stage 32 may include steps 315-324. In step 315, color data for all the color planes may be received by a printer (e.g., printer 100). In step 316, the first or next color plane may be processed. In step 317, the first or next block of the compressed image data may be processed.

In step 318, the algorithm may determine if the resolution reduction flag is set for the image component of the current block that is associated with the current color plane. If the resolution reduction flag is not set, it indicates that the delta image component of the current compressed image component has not been removed and the resolution of the corresponding image component remains as "A". Accordingly, in step 319, a print resolution in the main scan direction may be set for the printhead of the current plane corresponding to resolution "A". In some embodiments, printer 100 may use a CMYK color space and printhead 109 may comprise four printheads corresponding to the C, M, Y, and K planes, and the resolution for each printhead may be independently configurable.

If the resolution reduction flag is set in step 318, it indicates that the delta image of the current compressed image component has been removed and the resolution of the corresponding image component has been reduced from "A" to "B". Accordingly, in step 320, a print resolution in the main scan direction may be set for the printhead of the current plane corresponding to reduced resolution "B".

In step 321, it may be determined whether all the blocks in the current color plane have been processed by the printer. If there is still at least one block of the image data of the current color plane left unprocessed, the algorithm may go back to step 317 and process the next block. The algorithm can iterate through steps 317-321 until all the blocks have been processed by the printer.

In step 322, the color data of the current color plane may be decompressed. For example, the color data of the current plane may be decompressed by decompressor unit 106 using decompression algorithms and parameters corresponding to the compression algorithms and parameters used in step 304. For example, if JBIG compression is used in step 304, the JBIG decompression may be used in step 322. In some embodiments, the header in the print data transferred in step 314 may indicate the type of compression used in step 304.

In step 323, the printhead may be driven to print the color data of the current plane to develop a toner image for the current plane. For example, in printer 100, PWM pulses from PWM logic module 107 may be streamed to driver circuit 108, which may then transmit the PWM pulses to printhead 109. In some embodiments, laser beam from printhead 109 may be modulated and reflected off scanning mirror 110 and optical system 113, causing a latent image of charged and discharged areas to be built up on photosensitive drum 114, and a toner image may be developed based on this latent image at the developing station 115.

In step 324, it may be determined whether all the color planes have been processed by the printer. If there is still at least one color plane of the print image left unprocessed, the algorithm may go back to step 316 and process the next color plane. The algorithm can iterate through steps 316-324 until all the color planes have been processed by the printer, after which printer processing stage 32 may conclude.

Figure 4:
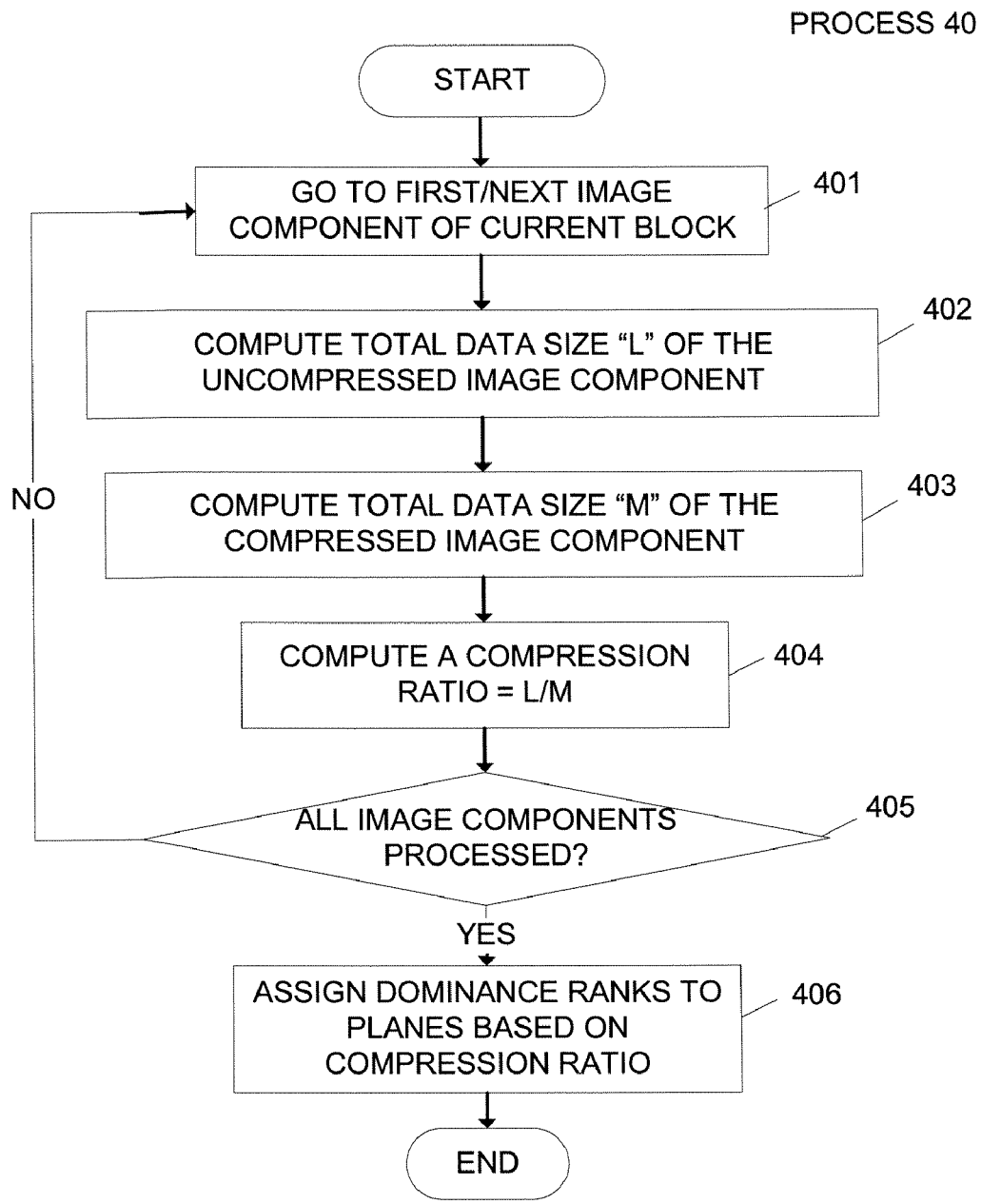
FIG. 4 is a flow chart of an exemplary operation process for determining the dominance rank of FIG. 3.

Various algorithms may be used to determine the dominance rank between a plurality of image components for an image block such as in step 305 of process 30. FIG. 4 shows a flow chart of a first exemplary operation process 40 for determining dominance rank for a certain image component. In exemplary process 40, dominance rank among image components may be determined based on compression ratios of the image components corresponding to the plurality of color planes. In some embodiments, dominance calculator 215 may be used to implement process 40.

In step 401, the first or the next image component associated with the first or the next color plane may be considered. In step 402, a total data size "L" may be computed for the uncompressed color data of the current image component. For example, the pixel number of the uncompressed color data may be counted by a routine of dominance calculator 215 in computer 200.

In step 403, a total data size "M" may be computed for the compressed color data of the current image component. After the compression process, the data size of color data may be significantly reduced. For example, in a wavelet-based JPEG 2000 compression, a wavelet-transform may be applied to the color data and re-distribute the values among the image pixels. After the transform, a large number of pixels may carry nominal values, and thus may be removed during a later stage of the compression process. For the purpose of the present disclosure, a nominal value may be a value that is close to zero. Accordingly, a non-nominal value is a value that is sufficiently distinct from zero. Pixels carrying non-nominal values may be retained in the compressed color data and transferred across connection 120. In some embodiments, the number of remaining pixels in the compressed color data may be counted by a routine of dominance calculator 215.

In step 404, a compression ratio of the color data of current image component may be calculated. For example, the compression ratio may be computed as "L" divided by "M". A higher compression ratio may indicate that the color data has a high compressibility. That is, during the compression, a signification portion of pixels carrying nominal values are removed. Accordingly, a higher compression ratio also indicates that the color data contain relatively less information (especially high resolution information) of the image. Therefore, the corresponding image component may be relatively less important than other image components.

In step 405, it may be determined whether image components associated with all the color planes have been considered and compression ratios calculated. If there is still at least one image component of the current block left unconsidered, the algorithm may iterate through steps 401-405 until all the image components have been considered.

In step 406, the plurality of image components may be assigned a dominance rank based on the compression ratios determined in step 404. For example, a dominance rank can be assigned by sorting the image components in ascending order of compression ratios. For example, a smaller number may be assigned to an image component associated with a highest compression ratio. For example, the K plane image component in a CMYK color space may have a highest compression ratio among the four image components. Accordingly, the K plane image component may be assigned a dominance rank with the lowest value relative to other image components, indicating that the K-plane image component is the least dominant image component.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for reducing data size of at least one bitmap image comprising at least one block, wherein the block comprises a plurality of image components, each image component being associated with a distinct color plane, the method comprising:
   compressing the plurality of image components of the at least one block and calculating the corresponding compression ratio for each image component;
   ranking the plurality of image components using a dominance rank, wherein the dominance rank for an image component is based on the compression ratio for the image component; and
   reducing the resolution of at least one image component associated with the block, if the dominance rank associated with the at least one image component is below a dominance rank threshold.

2. The method of claim 1, wherein ranking the plurality of image components using a dominance rank further comprises:
   calculating a compression ratio for each image component;
   sorting the image components in ascending order of the compression ratios; and
   assigning a dominance rank to a color plane based on the order of the image component associated with the color plane.

3. The method of claim 2, wherein calculating the compression ratio for each image component further comprises:
   determining a first data size of the uncompressed image component;
   determining a second data size of the compressed image component; and
   dividing the first data size by the second data size.

4. The method of claim 3, wherein the second data size of the compressed image component is determined by counting a number of pixels in the compressed image component.

5. The method of claim 1, wherein reducing the resolution of the at least one image component further comprises:
   deriving a lower resolution image and a delta image from the image component;
   compressing the lower resolution image and the delta image; and
   retaining the compressed lower resolution image, if the sum of a data size of the compressed lower resolution image and a data size of the compressed delta image exceeds a data-size threshold.

6. The method of claim 1, further comprising setting a print resolution for at least one color plane associated with the at least one image component based on the reduced resolution of the image component of the at least one color plane.

7. The method of claim 1, wherein reducing the resolution of the at least one image component associated with the block further comprises:
   deriving a lower resolution image and a delta image from the image component;
   tagging the color plane associated with the image component;
   growing a non-transition region in the tagged color plane based on the image component until a safe-transition block is reached, wherein the non-transition region comprises at least one additional block; and
   retaining the compressed lower resolution image of each image component in the non-transition region.

8. A non-transitory computer-readable medium that contains instructions which, when executed by a processor, performs steps in a method for reducing data size of at least one bitmap image comprising at least one block, wherein the block comprises a plurality of image components, each image component being associated with a distinct color plane, the method comprising:
   compressing the plurality of image components of the at least one block and calculating the corresponding compression ratio for each image component;
   ranking the plurality of image components using a dominance rank, wherein the dominance rank for an image component is based on the compression ratio for the image component; and
   reducing the resolution of at least one image component associated with the block, if the dominance rank associated with the at least one image component is below a dominance rank threshold.

9. The computer-readable medium of claim 8, wherein ranking the plurality of image components using a dominance rank further comprises:
   calculating a compression ratio for each image component;
   sorting the image components in ascending order of the compression ratios; and
   assigning a dominance rank to a color plane based on the order of the image component associated with the color plane.

10. The computer-readable medium of claim 9, wherein calculating the compression ratio for each image component further comprises:
    determining a first data size of the uncompressed image component;
    determining a second data size of the compressed image component; and
    dividing the first data size by the second data size.

11. The computer-readable medium of claim 10, wherein the second data size of the compressed image component is determined by counting a number of pixels in the compressed image component.

12. The computer-readable medium of claim 8, wherein reducing the resolution of the at least one image component further comprises:

deriving a lower resolution image and a delta image from the image component;

compressing the lower resolution image and the delta image; and retaining the compressed lower resolution image, if the sum of a data size of the compressed lower resolution image and a data size of the compressed delta image exceeds a data-size threshold.

13. The computer-readable medium of claim 8, wherein reducing the resolution of the at least one image component associated with the block further comprises:

tagging the color plane associated with the image component;

growing a non-transition region in the tagged color plane based on the image component until a safe-transition block is reached, wherein the non-transition region comprises at least one additional block; and retaining the compressed lower resolution image of each image component in the non-transition region.

14. A system comprising a computer coupled to a printer, wherein the computer and printer perform a method for reducing data size of at least one bitmap image comprising at least one block, wherein the block comprises a plurality of image components, each image component being associated with a distinct color plane, the system comprises:

a compressor configured to compress the plurality of image components of the at least one block and to calculate the corresponding compression ratio for each image component;

a dominance calculator configured to rank the plurality of image components using a dominance rank, wherein the dominance rank for an image component is based on the compression ratio for the image component; and a formatter configured to reduce the resolution of at least one image component associated with the block, if the dominance rank associated with the at least one image component is below a dominance rank threshold.

15. The system of claim 14, wherein the dominance calculator configured to rank the plurality of image components is further configured to:

calculate a compression ratio for each image component;

sort the image components in ascending order of the compression ratios; and assign a dominance rank to a color plane based on the order of the image component associated with the color plane.

16. The system of claim 15, wherein the dominance calculator configured to calculate the compression ratio for each image component is further configured to:

calculate a first data size of the uncompressed image component;

calculate a second data size of the compressed image component; and divide the first data size by the second data size.

17. The system of claim 14, wherein the formatter configured to reduce the resolution of the at least one image component is further configured to:

derive a lower resolution image and a delta image from the image component;

compress the lower resolution image and the delta image; and retain the compressed lower resolution image, if the sum of a data size of the compressed lower resolution image and a data size of the compressed delta image exceeds a data-size threshold.

* * * * *